May 12, 1953  R. H. PREWITT  2,638,170
AIRCRAFT PROPELLER OR ROTOR
Filed Jan. 28, 1947  3 Sheets-Sheet 1
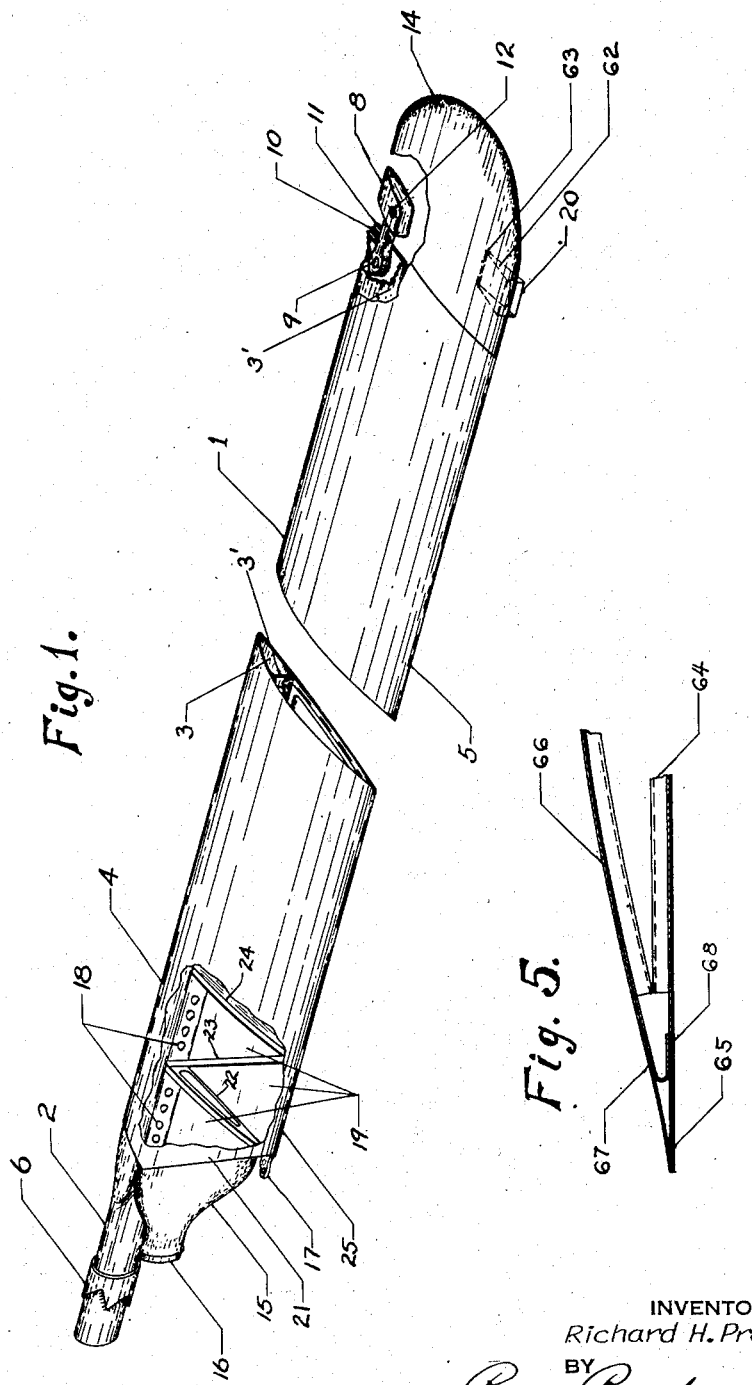
INVENTOR
Richard H. Prewitt
BY
Barr, Borden & Fox
ATTORNEY May 12, 1953
R. H. PREWITT
2,638,170
AIRCRAFT PROPELLER OR ROTOR
Filed Jan. 28, 1947
3 Sheets-Sheet 2
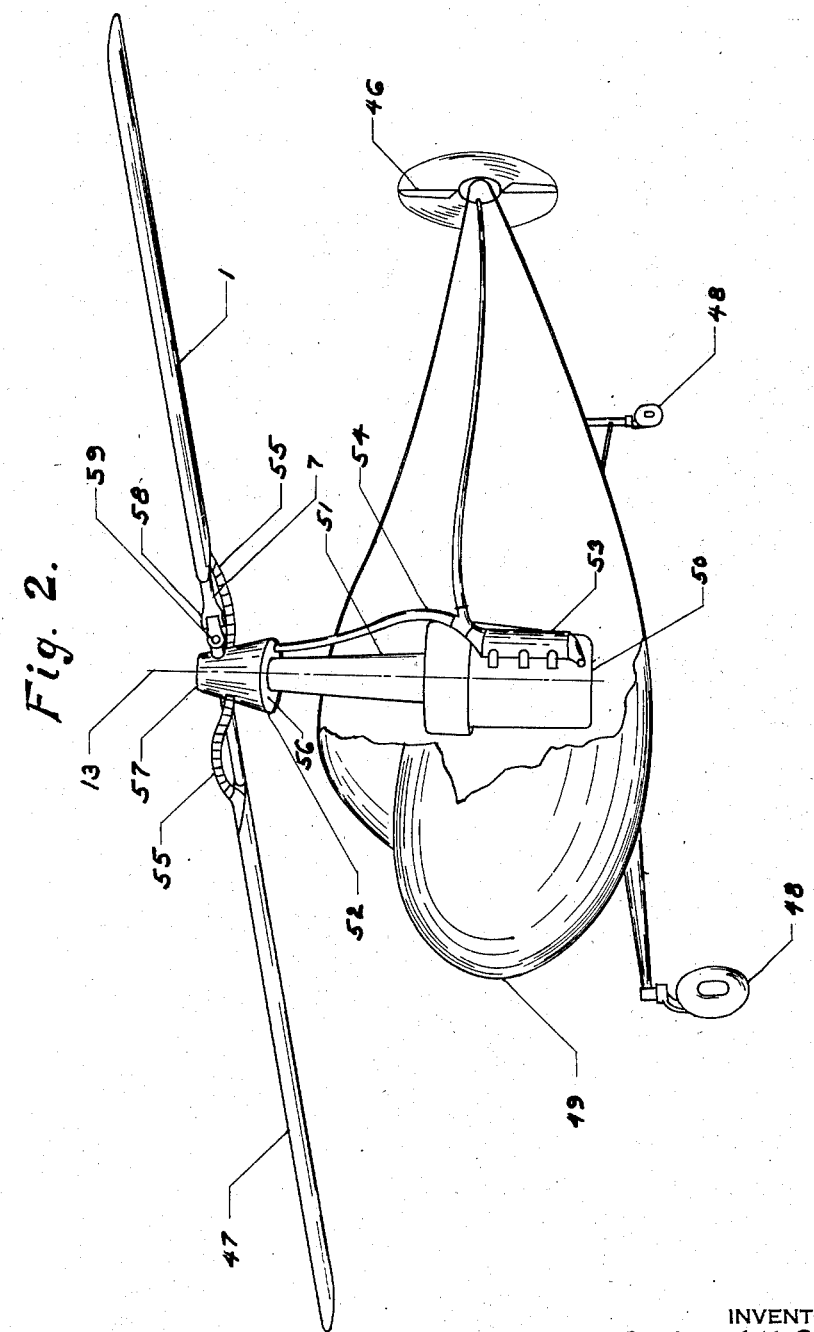
INVENTOR
Richard H. Prewitt,
BY
Barr, Borden & Fox
ATTORNEY

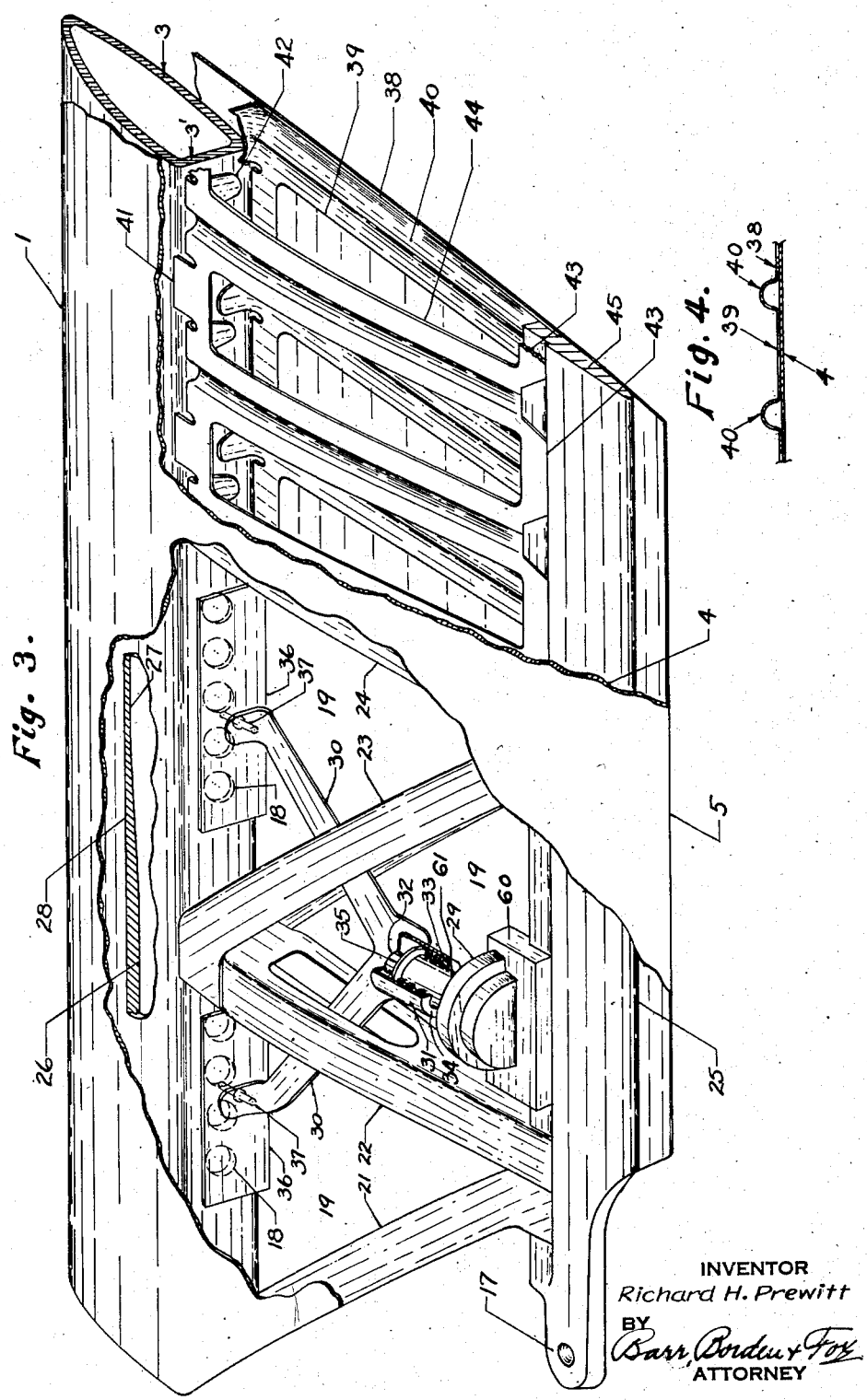

Patented May 12, 1953

2,638,170

UNITED STATES PATENT OFFICE 2,638,170

AIRCRAFT PROPELLER OR ROTOR

Richard H. Prewitt, Wallingford, Pa.

Application January 28, 1947, Serial No. 724,836

15 Claims. (Cl. 170—159)

This invention relates to aircraft propellers or rotors, and is more particularly concerned with features of blade construction, as fully described hereinafter.

In the past considerable difficulty has been experienced with blade failures occurring at the inboard end between the blade proper and the structure near the hub to which the blade is attached. These difficulties have been brought about as a result of fatigue risers occurring at abrupt section changes, as where pins or rivets or flanges are used to transfer the load from the blade proper to the inboard attaching structure. In order to avoid structural failures the weight of the blade attaching structure becomes excessive where existing fatigue risers are present.

The method of transforming from a round husky structural member (suitable for mating a machined part) to the main structural assembly of the blade proper, as taught in this invention, advances the art of rotor blade fabrication tremendously since many fatal accidents may be avoided due to the obviously better control over inspection and assembly of the simple parts disclosed in this invention. In addition, considerable weight can be saved, both at the inboard connection and throughout the blade. The latter weight saving is accomplished due to the fact that proper chordwise balance can be accomplished without the use of nose weights which do not contribute to the blade strength yet require a part of the remaining blade strength to carry the centrifugal and inertia forces that they exert on the hub.

This invention contemplates and it is a primary object hereof to provide a blade adaptable to mass production, yet incorporating all desired features; including deicing, smooth non-distorting external surface, leading edge non-abrasive characteristics, resistance to weathering, structural efficiency, and chordwise center of gravity adjustment. In addition, the invention includes design features which minimize structural failures resulting from fatigue.

Figure 1 shows a perspective view of a propeller or rotor blade. Figure 2 shows a partially completed elevation perspective view of a helicopter, incorporating the features of this invention. Figure 3 shows a cutaway perspective view of the internal end of the blade shown in Figure 1. Figure 4 shows a cross section of the stiffening members shown in Figure 3; and Figure 5 is an alternate modified construction of the trailing edge structure shown in Figure 3.

The blade construction taught in this invention involves the forming of a tubular member 2 into a nose airfoil shaped member 3 which maintains the external contour of the blade in its forward section. The tube is preferably a single integral tube formed by drawing operations into a plurality of portions having respectively different sectional profiles, one of which, at the root, is cylindrical or annular, and another of which is as of an airfoil nose section terminating toward the trailing edge of the blade, preferably in a generally flat vertical wall 3'. A thin sheet 4 of metal such, illustratively, as of stainless steel is completely wrapped around the formed nose member 3 and attached thereto by suitable adhesive. The stainless steel sheet 4 may extend to the trailing edge 5, or to any position short of the trailing edge, provided suitable supporting structure is used to maintain and support the external contour of the blade.

An external telescoping collar 6 is fitted over the inboard end of the tubular member 2 and suitably attached such as by welding, as shown, or other suitable means. The function of this collar is to transmit the centrifugal loads from the blade to its inboard connection, such as shown at 7, Figure 2. At the outboard end of blade 1, weight 8 is attached to formed spar tube 3 at pivot 9. Adjusting screw 10 is adjusted through bushing 11, which forms a part of nose airfoil shaped member 3. The center of gravity 12 of weight 8 lies slightly aft of a theoretical line passing between the axis of rotation of the rotor 13, Figure 2, and pivot 9 so that in operation a continual force is exerted on weight 8, tending to move it forward against adjusting screw 10. Thus, when the adjusting screw 10 is turned in a tightening sense, the weight is forced aft, and when the adjusting screw is turned in a loosening sense, the weight is permitted to move forward with the aid of centrifugal force acting upon it around its pivot 9. The tip of the blade is made of two formed members 14, suitably mated and attached to main cover 4 and nose airfoil shaped member 3 with screws to permit changing the size of the weight member 8 to account for variation in the longitudinal balance of the blade 1, resulting from manufacturing weight deviations. Adjustable weight member 8 is used to obtain proper chordwise center of gravity for blade 1. The effectiveness of moving a small weight fore and aft near the tip of the blade is great, relative to fore and aft movement of similar weights located near the axis of rotation 13, Figure 2.

At the inboard end of the blade, manifold 15 receives and transmits hot gases from a suitable source through flexible tubing 55 (Figure 2) attached at 16, and directs the hot gases into the aft inboard section of the blade at 19 from which the gases are sucked through holes 18 lying along the neutral axis of the nose airfoil shaped member. The centrifugal force acting on the column of hot gases within the nose airfoil shaped member 3 creates a suction which draws the hot gases through the leading edge of the blade, and out automatically adjusted vent 20 located at or near the tip of the blade. In an alternate construction the manifold 15 and holes 18 may be eliminated, and the hot gases may pass directly through the tube member 2 and the nose airfoil shaped member 3.

Experience has shown that the inboard end of the blade is subject to more than ordinary punishment due to the bending moments in the plane of rotation, resulting from blade dampers; or, in the case of rigid rotors, from the structural restraint against the natural tendency of the blades to move relative to each other in the plane of rotation. The blade of this invention shows stiffening structure at its inboard end, as illustrated by reinforcing ribs 21, 22, 23, and 24, and trailing edge member 25. A fitting 17 is incorporated in the blade either to provide a blade damper attachment point or to provide additional means of relieving stresses in the tubular member 2, or for increasing the stiffness of the blade in the plane of rotation. Exit slot 20 may be arranged to automatically close when the deicing system is inoperative, and to automatically open for exhausting the spent hot gases when the deicing system is operative. This is accomplished by locating the hinged door 62 comprising a hinge at 63, which under normal operating conditions will be kept closed due to greater external pressure than internal pressure. Yet when the deicing gases are turned on and a flow is established, the door will automatically open, resulting from higher internal pressure, to permit an exit for the deicing gases. In this system, when the hot gases are turned off the door will remain open for a short interval, and exhaust a portion of the internal gases in the blade until the internal pressure will be increased, due to arriving at a balance between the centrifugal forces acting on the column of air within the blade and the suction pressure on said column, when the door will close.

Figure 3 shows the inboard blade construction in more detail. The nose airfoil shaped member 3 may be seen in section at the upper end of Figure 3, and the cover 4 may be seen in more detail as shown by breakaway. In order to provide the most efficient blade it is necessary to reduce weight for payload considerations wherever possible, yet maintain structural integrity. It is well known in the art of blade design that additional strength is required at the inboard end of the blade, as well as at other specific locations along the blade. The nose airfoil shaped member 3 constitutes the main structural member of the blade taught in this invention, and means have been established for varying the wall thickness of this member as necessary, such as shown at 28, where the wall thickness is decreased from a heavy wall at 26 to a thin wall at 27, through a gradual taper, to avoid stress concentrations. This changing of the wall thickness may be accomplished at any point along the blade, or it may be successively applied at several different points.

An enlargement of the reinforcing structural members 21, 22, 23, and 24, along with the reinforced structural trailing edge member 25, is shown in Figure 3. In addition, an automatic thermostat controlling unit 29 operates between trailing edge member 25 and the aft side of nose airfoil shaped member 3 to automatically adjust the flow of hot gases internally of the nose airfoil shaped member 3, as required for deicing. Thus, for the system established, the hot deicing gases are permitted to flow through member 3 in cold weather, and are shut off automatically in hot weather. The structural member 24 is preferably constituted with a solid web to form a bulkhead or other chordwisely extending imperforate sheet or baffle to preclude the outboard movement of the heated gases behind the leading edge forming spar tube 3. Such bulkhead can be formed anywhere along the length of the spar tube 3 provided it is outwardly of the holes 18 and inwardly of the outboard end of the spar tube 3 so as to permit centrifugal force to be effective to move the heated gases through the spar tube 3. The operation of the unit is as follows:

Arms 30 are fixed to plates 36 and pins 37 which register in loose holes in the aft face of the nose airfoil shaped member 3. Said pins, along with the Y arms 30 and plates 36 are free to move fore and aft except for the control of the aforementioned thermostat unit 29 in combination with the effect of the associated mechanism described below. It may be noted that a section 3' of the nose airfoil shaped member 3 is bored with one or more holes or series of holes 18 and that plate or plates 36 register adjacent holes 18.

The aft ends of arms 30 are fixed to plunger 32 and collar 31 which carries flange 34 at its aft end. Stem 61 to which is fixedly attached collar 35 at its forward end forms a part of the case of the thermostat unit 29. Spring 33 is interposed between movable flange 34 and fixed collar 35 so as to continually exert a force tending to return plunger 32 and assembly, flange 34, collar 31, Y members 30, guide pins 37 and plates 36 aft creating a greater gap between the forward faces of said plates and the aft face of nose airfoil shaped member 3.

Thermostat unit 29 is supported to trailing edge structure 25 through resilient member 60. The thermostatic unit is arranged to respond to the temperatures of the gases, or to the temperature of the exterior of the blade, or as a resultant of both, according to desire. Thus, with increased temperature thermostat unit 29 expands tending to close the aperture between the aft areas 19 of the blade and internally of the nose airfoil shaped member 3. Additional expansion of thermostat 29 after plates 36 register against aft face of nose airfoil shaped member 3 is taken in resilient member 60. With plates 36 registered as described, the flow of air from chamber 19 to internally of member 3 is cut off.

When thermostat 29 is cooled it contracts, permitting spring 33 to force the plunger 32 into thermostat 29 and move assembly of ring 34, collar 31, Y members 30, guide pins 37, and plates 36 aft, opening a space between said plates and the aft faces of apertures 18, thus permitting the flow of hot air into the nose section 3 of the blade. Centrifugal forces acting on the column of air or gases within the nose airfoil shaped member 3 act as a suction pump to maintain a suitable flow of the deicing gases.

The aft section of the stainless steel cover is supported by a preformed metal structure, and a trailing edge member, shown in Figure 3. The exact nature of this structure and of the trailing edge may be varied to fit the circumstances involved in the specific blade under consideration. However, tests have indicated that the structure shown has certain specific advantages and that it is adequate.

It may be noted that the lower chord support structure 38 and upper chord support structure 44 are of continuous design from the structural member 24 to the tip of the blade. The design incorporates a blanked and formed continuous member 38, having lightening holes 39, semi-circular stiffening members 40, between substantial flats in a general "omega" section, shown in detail in Figure 4, skin support projections 41 and shear tabs 42. The aft end of the chord formed members 38 and 44 have projections 43 which overlap a trailing edge member 45. This trailing edge member may be either made from a solid piece of light material such as wood, Bakelite or other resins, or from a piece of formed metal, preferably of hollow construction. A further modification of this structure is shown in Figure 5.

In this modified form of the trailing edge structure chord member 64 (corresponding to member 38 of Figure 3) extends to a point 65 near the trailing edge and chord member 66 (corresponding to member 44 of Figure 3) is bent at 67 into a U shape, permitting a mating of chord member 66 with chord member 64 at 68 where the two chord members are securely connected by suitable adhesives.

It is contemplated to attach chord members 38 and 44 to external skin 4 and to formed nose member 3 and to trailing edge member 45 through suitable adhesive, preferably a thermo-setting material such as "Cycleweld." It is further intended to accomplish this adhesion by the use of external molds and internal pressure through a suitable rubber bag or container for transmitting the internal pressure to the chord members 38 and 44 so as to maintain suitable contact during the curing of the adhesive involved. By the use of an external mold, the external shape of each blade should be identical, providing improved performance.

Figure 2 shows several applications for the blade taught herein. For example, blades of the tail propeller or rotor 46 may utilize the construction taught herein, or blades 1 and/or 47 may utilize it. In more detail Figure 2 is shown as an incomplete example of a helicopter showing landing gear wheels 48, body 49, powerplant 50, rotor drive 51, manifold 52, heat exchanger 53, hot air duct 54, and individual blade hot air ducts 55. It is proposed to utilize the heat from the exhaust system of the powerplant 50 through heat exchanger 53 to provide the hot air through duct 54 at stationary disk 56 into the chamber internally of the rotating manifold collector 52, which supplies hot air to the blades hereinbefore described, through ducting 55. It may be noted that blade 1 is attached to hub 57 through vertical hinge 58 and horizontal hinge 59. Blade 1 is commonly known as a flapping type blade, and therefore it is desired that duct 55 be of flexible construction, attaching to apertures 16 of manifold 15 shown on Figure 1. However, in the case of the rigidly attached blade 47 it may be easier to eliminate the flexible manifold 55, and make this member more rigid. Likewise it may be desirable to conduct the gases directly through the inboard members of the blade, such as through the structural member 57 or blade 47, or through the members 57, 59, 58 and 7 to blade 1.

Engine controls and rotor controls, transmissions, clutches, seats, and the like, being so firmly established in the art, are not specifically shown and described herein. However, this invention contemplates the use of a blade in a propeller or rotor on a machine incorporating all of the devices necessary for successful flight. For example, no power connection is shown between the powerplant 50 and the tail propeller or rotor 46. Yet such connections are old in the art, and standard methods of power transmission controls, etc. are firmly established and are anticipated herein.

While a heat exchanger is shown for the source of heat, it is contemplated that other sources of heat may be utilized for providing the energy for blade deicing, such as a separate small heater unit incorporated in the inboard end of the blade, or on the hub, or in the body of the machine.

Having thus described my invention, I claim:

1. In an aircraft, a blade comprising a main structural member near the leading edge thereof, an external cover, chord supporting members aft of said main structural member formed of metal and incorporating angular shear tab extensions adhesively secured to the aft face of the main structural member, and a bonding adhesive layer between the contiguous juxtaposed surfaces of the external cover and the chord supporting members and the main structural member, to bond them all into a structural entity.

2. In an aircraft, an airfoil comprising a main structural member shaped to conform to the leading edge of an airfoil, chord supporting members aft of said main structural member having shear tabs, said chord supporting members incorporating transversely flat surfaces and a semi-circular rib formed as a groove between the flat surfaces, said tabs attached to the aft face of the main structural member, and an external cover adherent to the main structural member and to the flat surfaces of the chord supporting members to rigidify and bond all of said elements into a rigid structural entity.

3. An airfoil comprising a main structural member shaped to conform to the leading edge of the airfoil, upper and lower chord supporting members having shear tabs, said respective supporting members each incorporating a plurality of transversely flat surfaces and a plurality of semicircular ribs formed as grooves between flat surfaces, said tabs on each respective supporting member pointing respectively toward the opposite supporting member and attached to the aft face of the main structural member, and an external metal cover adherent to the main structural member and the flat surfaces of the upper and lower chord supporting members to rigidify and bond all of said elements into a rigid structural entity.

4. In a blade, a main structural means having an airfoil nose shape, an external cover, an internal rib formed member stiffening the upper part of said external cover, an internal rib formed member stiffening the lower part of said external cover, formed lips on the forward edge of said internal rib formed members arranged to attach said internal rib formed members to the aft face of said airfoil nose shaped main structural means with adhesives in relatively staggered relation.

5. In an airfoil, a main structural means having an airfoil nose shape, an external cover, an internal rib formed member stiffening the upper part of said external cover, an internal rib formed member stiffening the lower part of said external cover, formed lips on the forward edge of said internal rib formed members attaching said internal rib formed members to the aft face of said airfoil nose shaped main structural means with adhesives.

6. In a blade, an external cover, preformed upper and lower internal chord members supporting said external cover, one of said chord members being spanwisely substantially continuous for a major portion of the blade and preformed at its aft edge to register against the other internal chord member, and means to adhesively join said internal chord members at said registered preformation.

7. In a blade having a trailing edge, an airfoil shaped main structural member defining a nose, a plurality of preformed shallow chordwisely extending upper and lower respectively integral metal ribs connected to the member at one end and mutually spaced at said end perpendicularly of the chord line of the blade so that a spanwise through passage exists between the upper and lower ribs, and a metal external cover extending from the trailing edge around and adhesively secured to the nose and to the trailing edge and adhesively secured to the respective ribs from the structural member toward and close to said upper and lower trailing edge, said chordwise ribs extending respectively in integral series spanwisely throughout a major portion of the blade.

8. In an aircraft, a blade having a trailing edge and comprising a main structural member near the leading edge substantially continuous spanwisely of the blade, an external metal cover enclosing said structural member to define the leading edge of the blade and extending rearwardly toward the trailing edge, chordwise members extending between and secured to the structural member and the trailing edge of the blade and attached to said external cover, means attached to the cover and said chordwise members to rigidify the trailing edge of the blade, and reinforcing means disposed toward the inboard end of the blade and secured to said structural member and said cover and to said means for rigidifying the trailing edge, said means for rigidifying the trailing edge incorporating an attaching fitting projecting beyond said cover.

9. In a blade, a main structural member, a tip weight pivoted to the member on an axis transverse of the member, said tip weight having a center of mass spaced from said axis and movable substantially chordwisely of the blade and constituting a pivoted unit, and adjustable stop means mounted on the blade bearing against the unit to position the tip weight relative to the chord.

10. In a blade, a main structural spanwise hollow member having an airfoil profile in its leading edge, a tip weight, means pivoting the tip weight on an axis transverse of the leading edge so that the weight has generally chordwise movement, said weight having a center of gravity aft of the pivot so that centrifugal force on the blade urges the weight chordwisely toward the said leading edge about said pivot, and means mounted on the blade adjustable relative to said leading edge to limit the chordwise movement toward the leading edge to hold the weight at a desired chordwise location.

11. In a blade, a main structural means having an airfoil nose shape, an external metal cover, an internal rib formed member stiffening the upper part of said external member, an internal rib formed stiffener member stiffening the lower part of said external cover, formed lips on the forward edges of said internal rib members to attach said internal rib formed members to the aft face of said airfoil nose shaped structural means with adhesives.

12. In a blade, a main structural member having an aft face, an external metal cover enclosing said main structural member, preformed upper and lower internal chord members supporting said external cover, each of said members comprising a continuous integral shaped and punched sheet having spanwise and chordwise dimensioned apertures defining spanwisely spaced chordwisely extending elements, each of the elements comprising transversely flat surfaces and a semi-circular rib formed as a groove between the flat surfaces, and each chord member including angular shear tabs for imposition against the aft face of the main structural member, and adhesives between the respective transversely flat surfaces and said cover, and between the shear tabs and said aft face and between the cover and said main structural member to bond them into a rigid whole.

13. In a blade, a main structural member having a generally flat aft face, an external metal cover enclosing the main structural member and projecting rearwardly of the said aft face toward the trailing edge of the blade, preformed upper and lower chord members supporting said external cover, said preformed members each incorporating transversely flat surfaces and a semicircular rib formed as a groove between flat surfaces, said groove terminating toward the leading edge and said flat surfaces continuing beyond the groove termination and forming angular shear tabs imposed against the aft face of the main member, and adhesives between the shear tabs and said aft face, and between said transversely flat surfaces and said cover and between said cover and said main structural member.

14. In a blade, a main metal structural member having a generally D-shaped section to form an airfoil leading edge shaped nose and an aft surface, a metal cover substantially enclosing the nose of the member and defining the leading edge of the blade, adhesively secured to said nose and extending rearwardly beyond said aft surface, an upper and a lower pair of spanwisely spaced preformed chord elements each element of each pair comprised of a pair of transversely flat surfaces adhesively secured to the cover and separated by a rib presenting convexly away from the contiguous portions of said cover, said elements each having a shear tab angularly divergent from one of the transversely flat surfaces imposed against and adhesively anchored to said aft surface, means adjacent to said member having a substantially flat surface substantially coextensive with the adjacent flat surfaces of the pair of elements of both the upper and lower pairs of elements for spacing the respective elements depthwisely of the blade and adhesively secured to said cover between the elements of each pair, and means secured adhesively to and forming with the upper and lower chord elements and said cover the trailing edge of said blade.

15. In a blade, a main metal structural member having a generally D-shaped section to form an airfoil leading edge shaped nose and an aft surface, a metal cover substantially enclosing the nose of the member and defining the leading edge of the blade, adhesively secured to said nose and extending rearwardly beyond said aft surface, an upper and a lower pair of spanwisely spaced preformed chord elements each element of each pair comprised of a pair of transversely flat surfaces adhesively secured to the cover and separated by a rib presenting convexly away from the contiguous portions of said cover, said elements each having a shear tab angularly divergent from one of the transversely flat surfaces imposed against and adhesively anchored to said aft surface, means adjacent to said member having a substantially flat surface substantially coextensive with the adjacent flat surfaces of the pair of elements of both the upper and lower pairs of elements for spacing the respective elements depthwisely of the blade and adhesively secured to said cover between the elements of each pair, means secured adhesively to and forming with the upper and lower chord elements and said cover the trailing edge of said blade, and supplemental means adjacent to said trailing edge having a substantially flat surface substantially coextensive with the adjacent flat surfaces of the pair of elements for spacing the respective elements of its pair at the trailing edge.

RICHARD H. PREWITT.

References Cited in the file of this patent

UNITED STATES PATENTS

| Number | Name | Date |
|---|---|---|
| 1,950,411 | Larsen | Mar. 13, 1934 |
| 2,123,429 | Klemm | July 12, 1938 |
| 2,152,861 | Bennett | Apr. 4, 1939 |
| 2,183,158 | Bennett | Dec. 12, 1939 |
| 2,303,707 | Pullin | Dec. 1, 1942 |
| 2,341,997 | Law | Feb. 15, 1944 |
| 2,380,583 | Cierva | July 31, 1945 |
| 2,397,450 | Watter | Mar. 26, 1946 |
| 2,410,056 | Fresco | Oct. 29, 1946 |
| 2,417,647 | Hasler | Mar. 18, 1947 |
| 2,420,174 | Hunt | May 6, 1947 |
| 2,426,123 | Sikorsky | Aug. 19, 1947 |
| 2,426,130 | Wald | Aug. 19, 1947 |
| 2,427,853 | Goodlet | Sept. 23, 1947 |
| 2,430,948 | Platt | Nov. 18, 1947 |
| 2,440,115 | Palmatier | Apr. 20, 1948 |
| 2,451,541 | Doman | Oct. 19, 1948 |
| 2,460,351 | Hoffman | Feb. 1, 1949 |